Patented Aug. 17, 1943

2,327,105

UNITED STATES PATENT OFFICE 2,327,105

PEST CONTROL

Hubert G. Guy, Newark, Del., assignor to E. I. du Pont de Nemours & Company, Wilmington, Del., a corporation of Delaware No Drawing. Application May 8, 1940,
Serial No. 333,929

1 Claim. (Cl. 167—24)

This invention relates to compositions of matter useful in controlling plant pests such as insects, fungi, and similar organisms, and is particularly directed to rotenone-containing spray concentrates of the self-dispersible type in which the rotenone is activated and stabilized by a thiuram sulfide.

As described in my co-pending application Serial No. 204,740 filed April 28, 1938, now Patent No. 2,227,496, issued January 7, 1941, of which this application is in part a continuation, I have found that the thiuram sulfides, particularly tetraethylthiuram monosulfide, activate and stabilize rotenone-containing insecticides. I have further found that a preferred way of obtaining the benefit of this discovery is to include both the rotenone and the thiuram sulfide in a mutual solvent which may be readily emulsified.

Suitable compositions embodying the principles of this invention may be prepared from a brown camphor oil rotenone extract of the character disclosed in U. S. Patent 2,058,200. The function of the brown camphor oil is that of a blending agent to blend and solubilize the derris resins, including the rotenone, into a spray oil. The brown camphor oil extract of the following compositions contains 20 per cent total extractives and 5 per cent rotenone.

Example 1

The brown camphor oil extract, tetraethylthiuram sulfide, and the coconut oil are blended together in the proportions of 2 parts of the extract to one part each of tetraethylthiuram monosulfide and coconut oil, and dispersed as a fifty per cent emulsion in a casein-borax solution containing 6 parts of casein and 3 parts of borax per 80 parts of water. A stable emulsion is obtained by passing the oil base and the dispersing medium thru a colloid mill, and a stable, more fluid emulsion is obtained by including about 1 or 2% sodium lauryl sulfate. The emulsion so prepared is sufficiently stable that it may be diluted with large quantities of water. One part in 500 or more parts of water is sufficient to provide a spray which is effective in controlling red spider on bean plants. For instance, when diluted in the proportions of one part of the concentrated emulsion to 500 parts of water and sprayed on bean plants infested with red spider, 96 per cent control was obtained.

In place of borax other alkali may be used for solubilizing the casein. In place of the casein other colloidal dispersing agents may be employed. In place of the sodium lauryl sulfate other highly active wetting agents may be employed. In place of the coconut oil other plant spray oils such as peanut oil, soya bean oil, cottonseed oil, castor oil, olive oil, corn oil and mineral oils may be used.

Another suitable composition is prepared as follows:

Example 2

In this example a concentrate of the self-dispersible type is prepared by blending together 25 parts of the brown camphor oil rotenone extract, 12.5 parts coconut oil, 12.5 parts tetraethylthiuram monosulfide, 20 parts of the paraffin oil, and 30 parts of the oil-soluble dispersing agent, piperidine oleate. An emulsion suitable for spraying plants infested with red spider is obtained from this concentration simply by dispersing it in the proper quantity of water. Effective control of red spider is obtained with sprays containing one part of the concentrate per 500 parts of water. Even at dilutions of one part of the concentrate to 1500 parts of water 66 per cent control of red spider on bean plants has been obtained.

Either one or both of the coconut oil or paraffin oil may be replaced by any one or more of the plant spray oils mentioned in Example 1. The piperidine oleate may be replaced by any suitable oil-soluble emulsifying agents, for example, the oil-soluble sulfonates of mineral oils or fatty oils such as Turkey red oil.

Another suitable composition is prepared as follows:

Example 3

A solution of rotenone and tetraethylthiuram monosulfide in a spray oil base is obtained by blending together 19 parts of the brown camphor oil rotenone extract, one part of tetraethylthiuram monosulfide, 30 parts of paraffin oil (a straw paraffin oil of viscosity 65 sec. Saybolt), and 25 parts coconut oil. Eight and one-third parts of N-diethyl-N-cyclohexylamine lauryl sulfate, which is not itself oil soluble, is blended into this oil solution by the aid of 16 and ⅔ parts of oleyl alcohol. There is obtained a clear solution which is dispersible in large quantities of water to form stable emulsions. When diluted in its portions of one part of the concentrate to four or five hundred parts of water a spray is obtained which is effective in controlling red spider on rose plants and which can be applied to a wide variety of roses without injury to delicate foliage.

The coconut oil can be replaced with paraffin oil, but the sprays obtainable from such concentrates are likely to cause slight injury to some varieties of roses. The coconut oil may also be replaced by other vegetable oils as described in Example 1. In place of the paraffin oil any plant spray mineral oil may be used. In place of the oleyl alcohol I may use any of the water-insoluble normally liquid alcohols. Octyl alcohol and lauryl alcohol for example are excellent blending agents. In place of the N-diethyl-N-cyclohexylamine lauryl sulfate I may use other suitable dispersing agents, tho I prefer to use the amine salts of the higher alcohol sulfates, for example, as set forth in U. S. Patent 2,139,256 granted December 6, 1938. If the wetting agent is of the oil soluble type the oleyl alcohol may be omitted.

The proportions in the several examples may be varied over considerable range. For example, the brown camphor oil extract may vary from about 10 to about 38 per cent, the tetraethyl thiuram monosulfide may vary from about 0.5 to 5 per cent, the plant spray oil may vary from about 25 to about 65 per cent, and the wetting agent plus blending agent, if any, may vary from about 5 to about 50 per cent, provided the proportions are selected to give a clear solution.

While I have described my invention with respect to the brown camphor oil rotenone extracts it will be understood that other blending agents besides the brown camphor oil may be employed. Numerous of such blending agents are known to those skilled in the art and are available on the open market. Also, other soluble thiuram sulfides may be used, as set forth in the parent application. The thiuram monosulfides, especially tetraethylthiuram monosulfide, are particularly suitable in view of their high oil solubility. These and other variations, such as described in connection with the foregoing examples, may be made without departing from the spirit of the invention.

I claim:

A self-dispersible composition comprising a substantially anhydrous liquid vehicle containing in clear solution rotenone, tetraethylthiuram monosulfide and an amine salt of a higher alcohol sulfate, said vehicle being constituted principally of plant spray oil and containing brown camphor oil and a water-insoluble liquid alcohol in the amounts required to blend and solubilize the rotenone and the amine salt in said oil.

HUBERT G. GUY.